(12) United States Patent
Liu (10) Patent No.: US 8,353,432 B2
(45) Date of Patent: Jan. 15, 2013

(54) STROLLER HAVING A ROTARY ACCESSORY DEVICE

(75) Inventor: Yongli Liu, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 327 days.

(21) Appl. No.: 12/769,820

(22) Filed: Apr. 29, 2010

(65) Prior Publication Data

US 2010/0276909 A1 Nov. 4, 2010

(30) Foreign Application Priority Data

Apr. 29, 2009 (TW) .............................. 98114249 A (51) Int. Cl.
*B62B 9/12* (2006.01)

(52) U.S. Cl. ................... 224/409; 280/33.992; 280/650; 403/93

(58) Field of Classification Search ............. 280/33.993, 280/47.38, 639, 642–643, 644, 647, 648–649, 280/650, 658, 195.13, 218.1, 218.2, 218.3, 280/219.12, 440.11; 403/93, 97; 224/409
See application file for complete search history.

(56) References Cited

U.S. PATENT DOCUMENTS

| | | | | |
|---|---|---|---|---|
| 5,992,566 | A * | 11/1999 | Yeh ................................ | 182/163 |
| 6,357,784 | B1 * | 3/2002 | Mitzman ....................... | 280/642 |
| 6,368,006 | B1 * | 4/2002 | Yang et al. ..................... | 403/84 |
| 6,390,427 | B1 * | 5/2002 | McConnell et al. ...... | 248/231.61 |
| 6,409,205 | B1 * | 6/2002 | Bapst et al. .................... | 280/642 |
| 6,464,244 | B1 * | 10/2002 | Cheng ............................ | 280/650 |
| 6,513,827 | B1 * | 2/2003 | Barenbrug .................... | 280/648 |
| 6,550,801 | B1 * | 4/2003 | Newhard ....................... | 280/642 |
| 6,629,801 | B2 * | 10/2003 | Cheng ............................ | 403/101 |
| 7,278,652 | B2 * | 10/2007 | Riedl et al. .................... | 280/642 |
| 7,374,196 | B2 * | 5/2008 | Hartenstine et al. .......... | 280/642 |
| 7,396,039 | B2 * | 7/2008 | Valdez et al. .................. | 280/644 |
| 7,523,954 | B2 * | 4/2009 | Dotsey et al. .................. | 280/642 |
| 7,686,322 | B2 * | 3/2010 | Longenecker et al. ....... | 280/642 |
| 7,717,457 | B2 * | 5/2010 | Bearup et al. ................. | 280/647 |
| 7,798,515 | B2 * | 9/2010 | Valdez et al. .................. | 280/647 |
| 8,033,218 | B2 * | 10/2011 | Kambara ....................... | 101/129 |
| 8,070,179 | B2 * | 12/2011 | Pike et al. ...................... | 280/642 |
| 2010/0276909 | A1 * | 11/2010 | Liu ................................. | 280/650 |
| 2011/0298198 | A1 * | 12/2011 | Minato et al. ................. | 280/648 |

FOREIGN PATENT DOCUMENTS

CN 2902832 Y 5/2007

* cited by examiner

*Primary Examiner* — J. Allen Shriver, II
*Assistant Examiner* — James Triggs
(74) *Attorney, Agent, or Firm* — Baker & McKenzie LLP (57) ABSTRACT

An accessory support device for a stroller apparatus comprises a coupling fixture securely mounted on a handle of a stroller and including a plurality of latching openings, a rotary socket pivotally assembled with the coupling fixture and including a detent and a connecting portion, and an accessory support frame detachably fastened with the connecting portion of the rotary socket. The accessory support frame is operable to rotate with the rotary socket relative to the coupling fixture, and the detent is movable to engage with any one of the latching openings for locking the accessory support frame at different angular positions relative to the coupling fixture.

20 Claims, 13 Drawing Sheets

STROLLER HAVING A ROTARY ACCESSORY DEVICE

CROSS-REFERENCE TO RELATED APPLICATION

This application claims priority to Taiwan Patent Application No. 098114249, which was filed on Apr. 29, 2009.

BACKGROUND OF THE INVENTION

1. Field of the Invention

The present invention relates to accessory parts for a stroller apparatus, and more particularly to a stroller apparatus having a rotary accessory support device.

2. Description of the Related Art

Chinese Patent Application no. CN200620070283.8, the disclosure of which is incorporated herein by reference, discloses a stroller apparatus provided with an adjustable handle. The adjustable handle is pivotally coupled with the stroller frame, such that the handle can be rotated between at least two different positions: a first position where it is inclined rearward, and a second position where it is inclined forward. In addition, the handle may also be provided with a tray for facilitating the placement of a drink bottle or like fluid containers. When the orientation of the handle is changed, the tray must also be accordingly adjusted to permit proper use. Unfortunately, the conventional construction does not allow convenient operation of the tray, and also fails to securely lock the position of the tray.

Therefore, there is a need for an accessory support device that can address the foregoing issues in a cost-effective manner.

SUMMARY

The present application describes a stroller apparatus that has an accessory support device pivotally coupled with the handle of the stroller.

In one embodiment, the accessory support device comprises a coupling fixture securely mounted on a handle of a stroller and including a plurality of latching openings, a rotary socket pivotally assembled with the coupling fixture and including a detent and a connecting portion, and an accessory support frame detachably fastened with the connecting portion of the rotary socket. The accessory support frame is operable to rotate with the rotary socket relative to the coupling fixture, and the detent is movable to engage with any one of the latching openings for locking the accessory support frame at different angular positions relative to the coupling fixture.

In other embodiments, a stroller apparatus is described. The stroller apparatus comprises a stroller frame, a handle, a coupling fixture securely mounted on the handle and including a plurality of latching openings, a rotary socket pivotally assembled with the coupling fixture and including a detent and a connecting portion, and an accessory support frame detachably fastened with the connecting portion of the rotary socket. The accessory support frame is operable to rotate with the rotary socket relative to the coupling fixture, and the detent is movable to engage with any one of the latching openings for locking the accessory support frame at different angular positions relative to the coupling fixture.

DETAILED DESCRIPTION OF THE EMBODIMENTS

The present application describes a stroller apparatus that has an accessory support device pivotally coupled with the handle of the stroller. The accessory support device may include a bottle holder, a tray, or like support structures capable of conveniently holding various articles on the handle at a location easily accessible to an adult.

Figure 1:
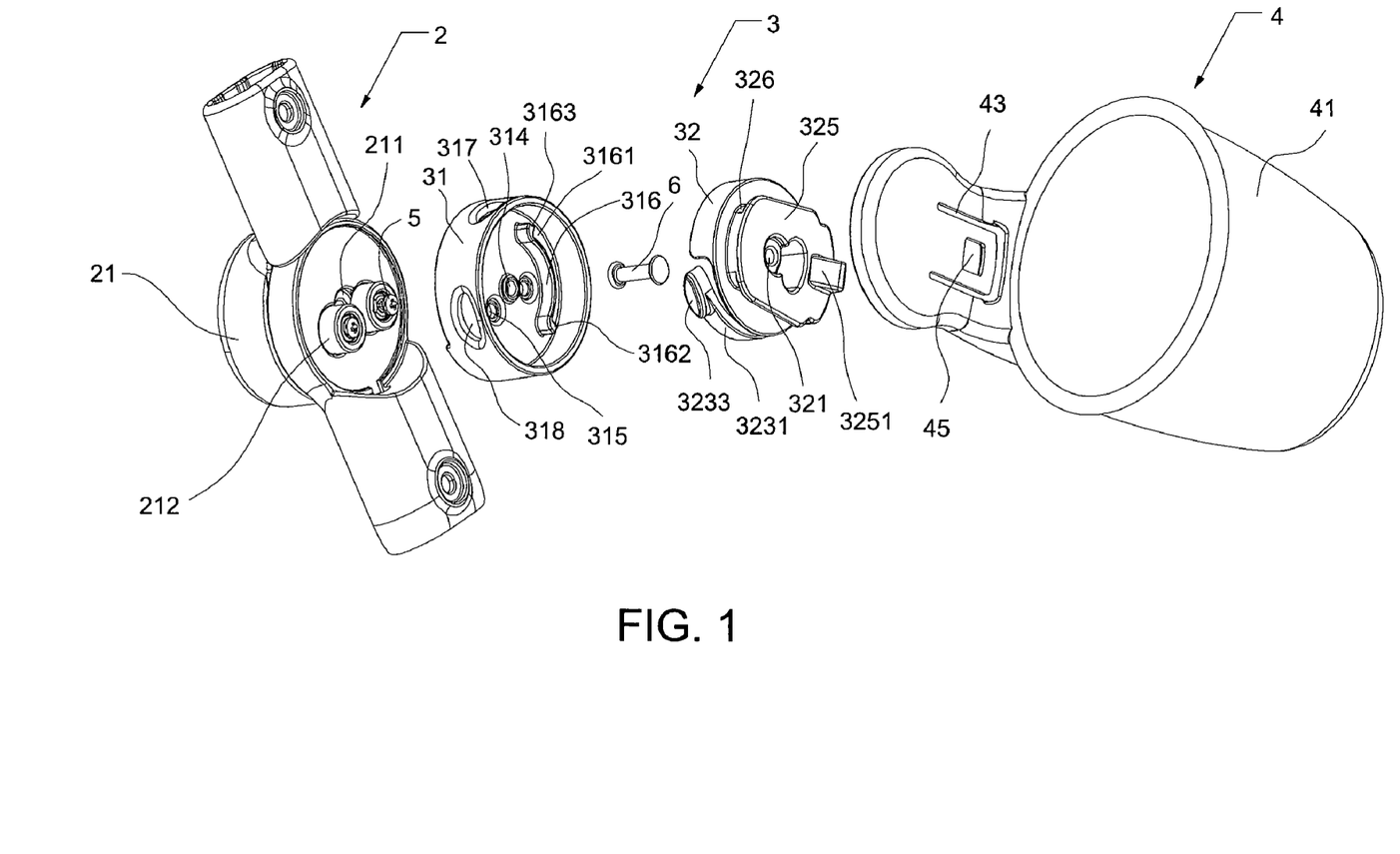
FIG. 1 is an exploded view illustrating a first embodiment of an accessory support device.
Figure 9:
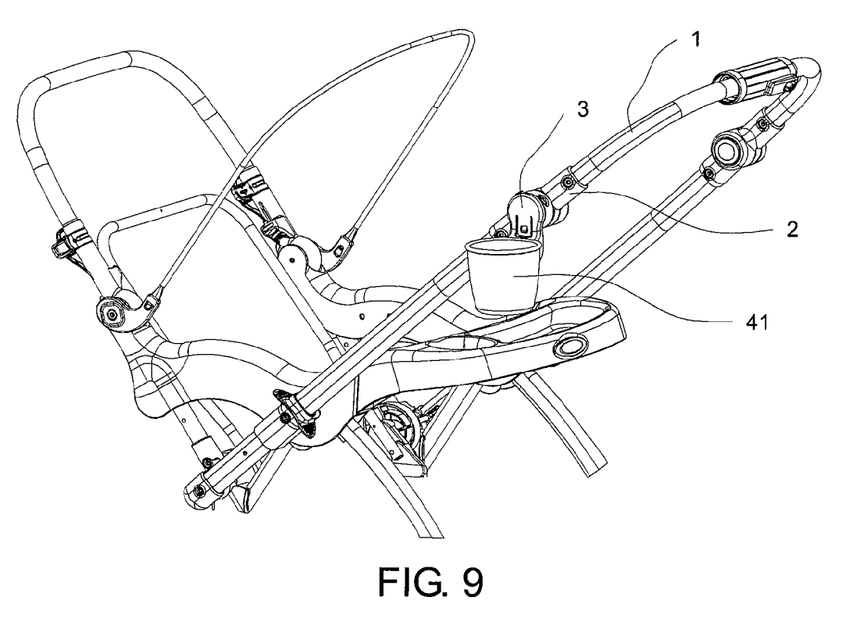
FIG. 9 is a schematic view illustrating a first position of the handle in the stroller apparatus with the accessory support device locked in a first position.
Figure 10:
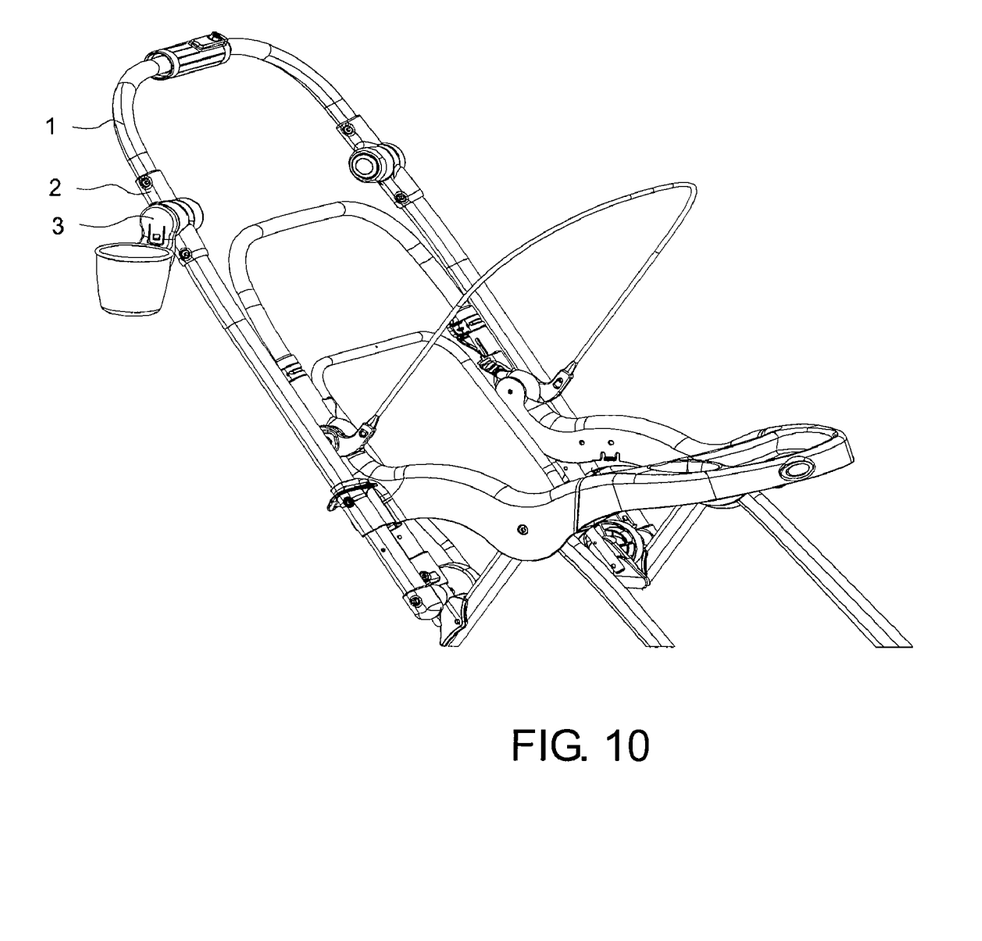
FIG. 10 is a schematic view illustrating a second position of the handle in the stroller apparatus with the accessory support device locked in a second position.

FIGS. 1-5 and FIGS. 6-10 are various schematic views illustrating a first embodiment provided with an accessory support device. As shown in FIGS. 1, 9 and 10, the first embodiment comprises a handle 1 coupled with a stroller frame, a connecting structure 2 provided on the handle 1, and a coupling structure 3 adapted to assemble with the connecting structure 2. The connecting structure 2 includes a base 21 having a central region provided with a hole 211, and two threaded holes 212 located at two sides of the hole 211. The coupling structure 3 includes a coupling fixture 31, a rotary socket 32 pivotally mounted on the coupling fixture 31, and an accessory support frame 4 detachably mounted with the rotary socket 32. The rotary socket 32 is pivotally assembled in the coupling fixture 31 in a snugly manner. Holes 314 and 321 are provided at central regions of the coupling fixture 31 and rotary socket 32, respectively. Two screws 5 engage through the two threaded holes 212 of the base 21 and two corresponding threaded holes 315 of the coupling fixture 31 for affixing the coupling fixture 31 with the connecting structure 2. A rivet 6 is passed respectively through the holes 211, 314 and 321 of the base 21, the coupling fixture 31 and the rotary socket 32 for pivotally assembling the rotary socket 32 with the coupling fixture 31 and connecting structure 2.

Figure 2:
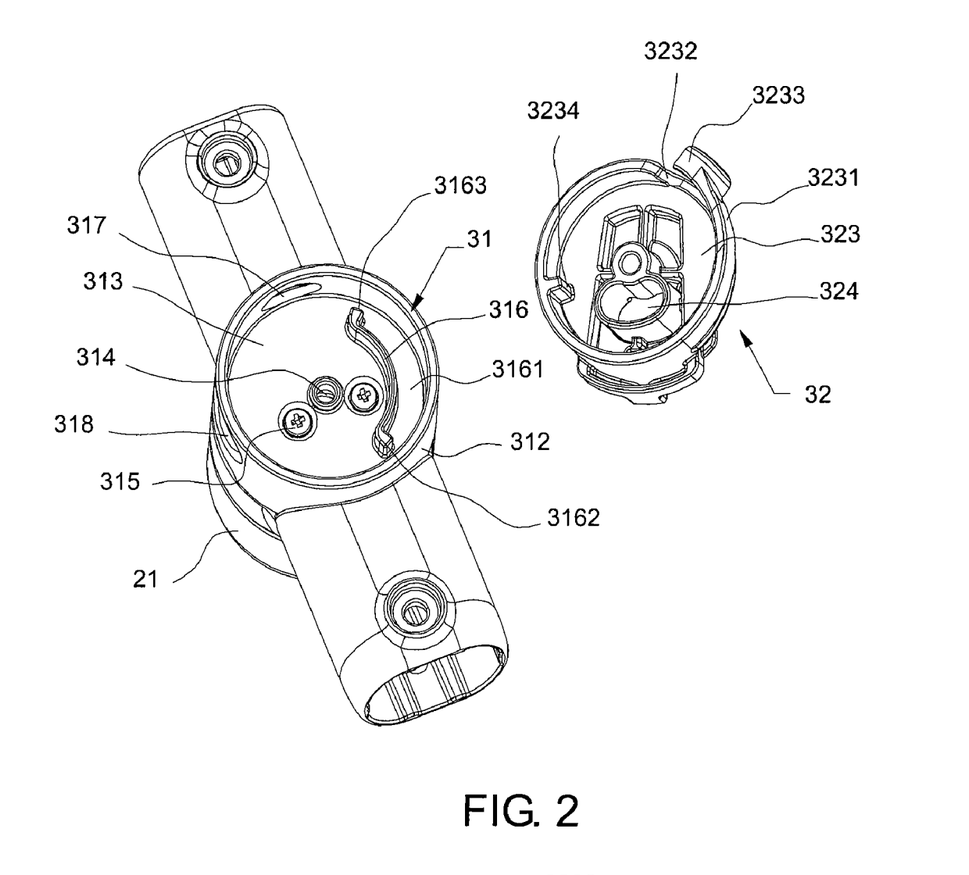
FIG. 2 is a perspective view illustrating the coupling fixture and the rotary socket.

Referring to FIG. 2, the coupling fixture 31 includes an outer sidewall 312 lying at periphery of the coupling fixture 31. The outer sidewall 312 has a generally cylindrical shape that delimits at least partially an inner space 313 of the coupling fixture 31. A bottom surface of the inner space 313 includes a central hole 314, and two threaded holes 315 at two opposite sides of the central hole 314. In addition, a curved rib 316 also protrudes from the bottom surface of the inner space 313 proximate to one of the two threaded holes 315 and at a location spaced apart from the outer sidewall 312. The curved rib 316 has a profile that is substantially parallel with the outer sidewall 312, such that an arc-shaped sliding track 3161 is defined at least partially between the curved rib 316 and the outer sidewall 312. Two opposite ends of the curved rib 316 also form a first and second stop portion 3162, 3163, respectively located at two opposite ends of the sliding track 3161. The outer sidewall 312 includes a first latching opening 317 and second latching opening 318 through which an engagement stud 3233 of the rotary socket 32 can engage for locking rotation of the rotary socket 32. The first and second latching openings 317, 318 are disposed at different radial directions relative to the rotation axis defined by the rivet 6. The first and second stop portions 3162, 3163 act to restrict movement of a stud 3234 protruding inwardly from the rotary socket 32, such that the stud 3234 is restricted to move along the sliding track 3161 between the first and second stop portions 3162 and 3163.

Figure 3:
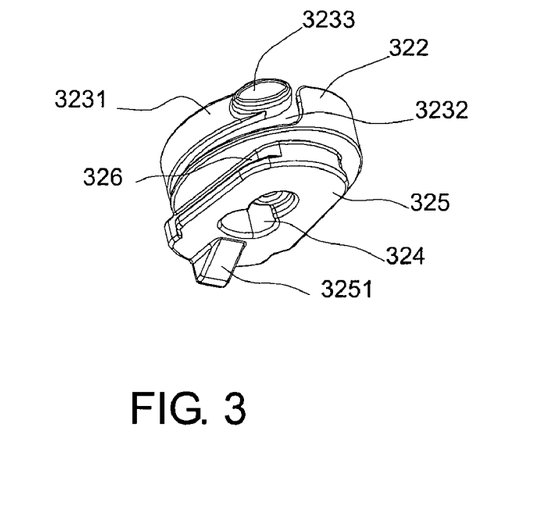
FIG. 3 is a perspective view of the rotary socket.
Figure 4:
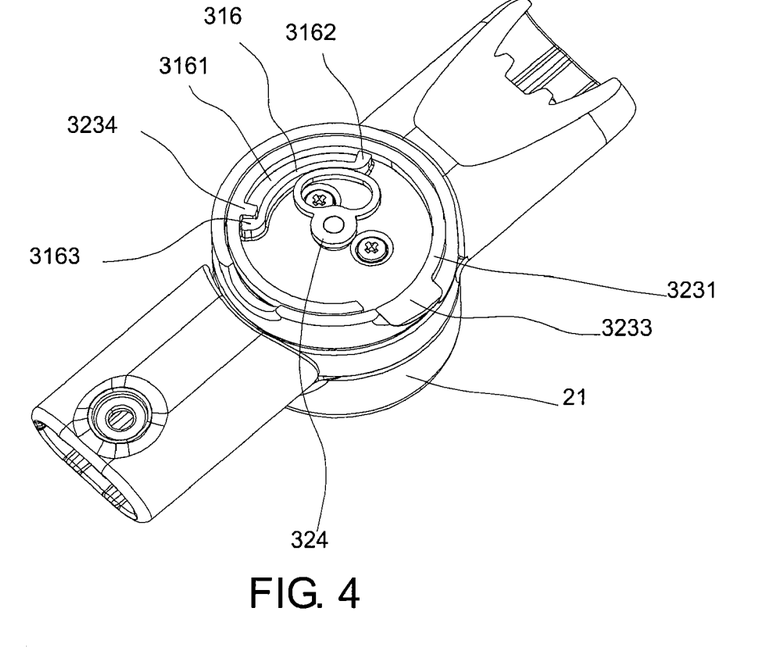
FIG. 4 is a schematic view illustrating how a portion of the rotary socket is assembled with the coupling fixture.
Figure 5:
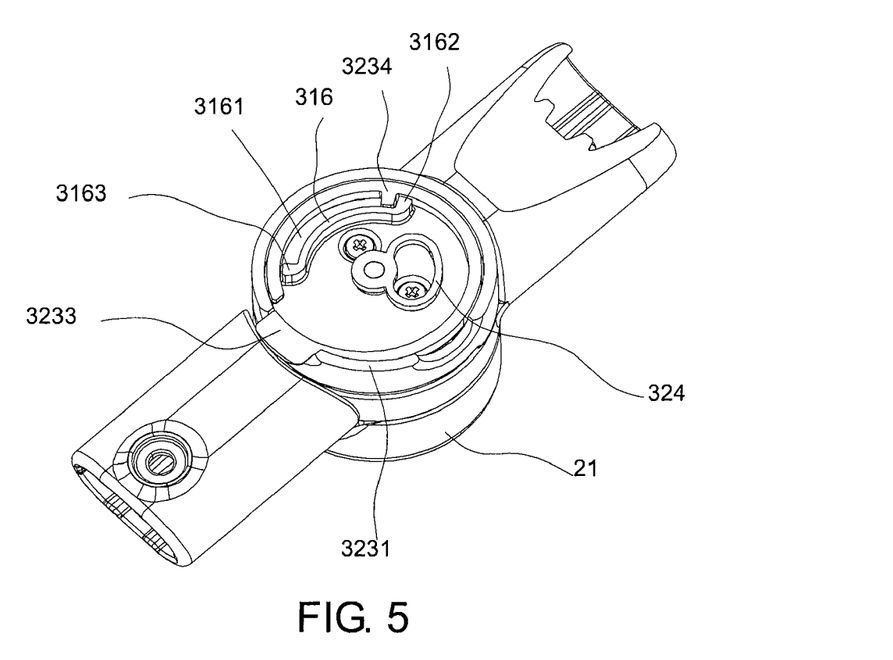
FIG. 5 is a schematic view illustrating how a protruding stud in the rotary socket moves relative to the coupling fixture during rotation of the rotary socket.

Referring to FIGS. 2 and 3, the rotary socket 32 includes an outer sidewall 322 having a generally cylindrical shape that delimits at least partially an inner space 323. A generally "8"-shaped hole 324 is formed centrally through a bottom surface of the inner space 323. A curved gap 3232 is also cut through the outer sidewall 322 of the inner space 323. A detent 3231 provided with an engagement stud 3233 at one end thereof is thereby formed at a side of the curved gap 3232, extending from the outer sidewall 322. The engagement stud 3233 is integrally formed and resiliently connected with the rotary socket 32. The engagement stud 3233 is connected with the outer sidewall 322 of the rotary socket 32 via the detent 3231. The stud 3234 protrudes inward and is positioned in the sliding track 3161 of the coupling fixture 31. A connecting portion 325 projects from the rotary socket 32 at a side opposite the inner space 323. The connecting portion 325 includes a neck 326 adapted to engage with a retainer flange 42 on the accessory support frame 4 for attaching the accessory support frame 4 with the rotary socket 32. A distal end surface of the connecting portion 325 also includes a catch 3251 adapted to snap fit through an opening 45 provided on the accessory support frame 4.

Referring to FIGS. 4, 5, 7 and 8, when the rotary socket 32 rotates an angle around the rotation axis of the rivet 6 relative to the coupling fixture 31, the stud 3234 slides until it reaches and is arrested by either of the first and second stop portions 3162, 3163. When the stud 3234 abuts against one of the first and second stop portions 3162, 3163, the engagement stud 3233 on the detent 3231 can engage through one of the latching openings (i.e., either of the first and second latching openings 317 and 318) and protrude outside on the outer sidewall 312 for locking the position of the rotary socket 32 and accessory support frame 4 relative to the coupling fixture 31. After the orientation of the handle 1 is changed, the position of the accessory support frame 4 can be changed by first pushing on the engagement stud 3233, which previously lies engaged through one of the latching openings 317 and 318 and protrudes from the inner space 313 to the outside of the outer sidewall 312. As a result, the detent 3231 deforms and causes the engagement stud 3233 to disengage from the first or second latching opening 317, 318, and moves the engagement stud 3233 into the inner space 313 of the coupling fixture 31, whereby allowing rotation of the rotary socket 32 and accessory support frame 4 relative to the coupling fixture 31. The accessory support frame 4 and rotary socket 32 can then be rotated in unison around the axis of the rivet 6, until the engagement stud 3233 engages with another latching opening under resilient action of the detent 3231 for locking the accessory support frame 4.

Figure 6:
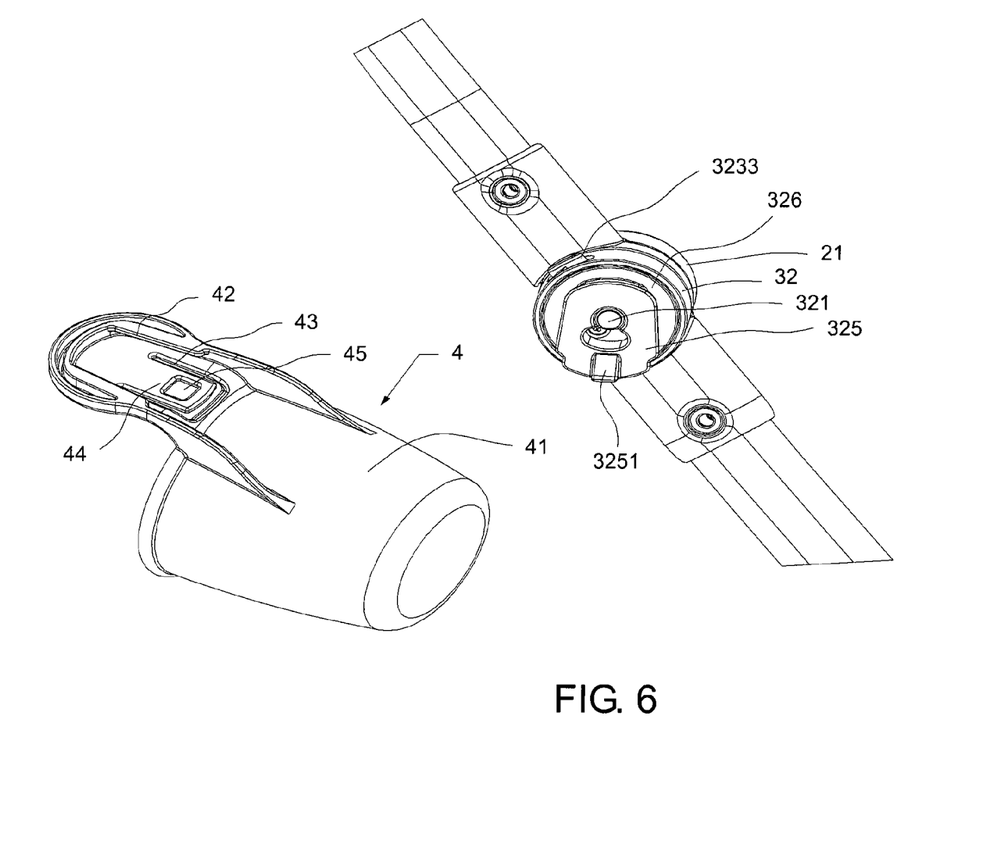
FIG. 6 is a perspective view illustrating the rotary socket and the accessory support frame.
Figure 7:
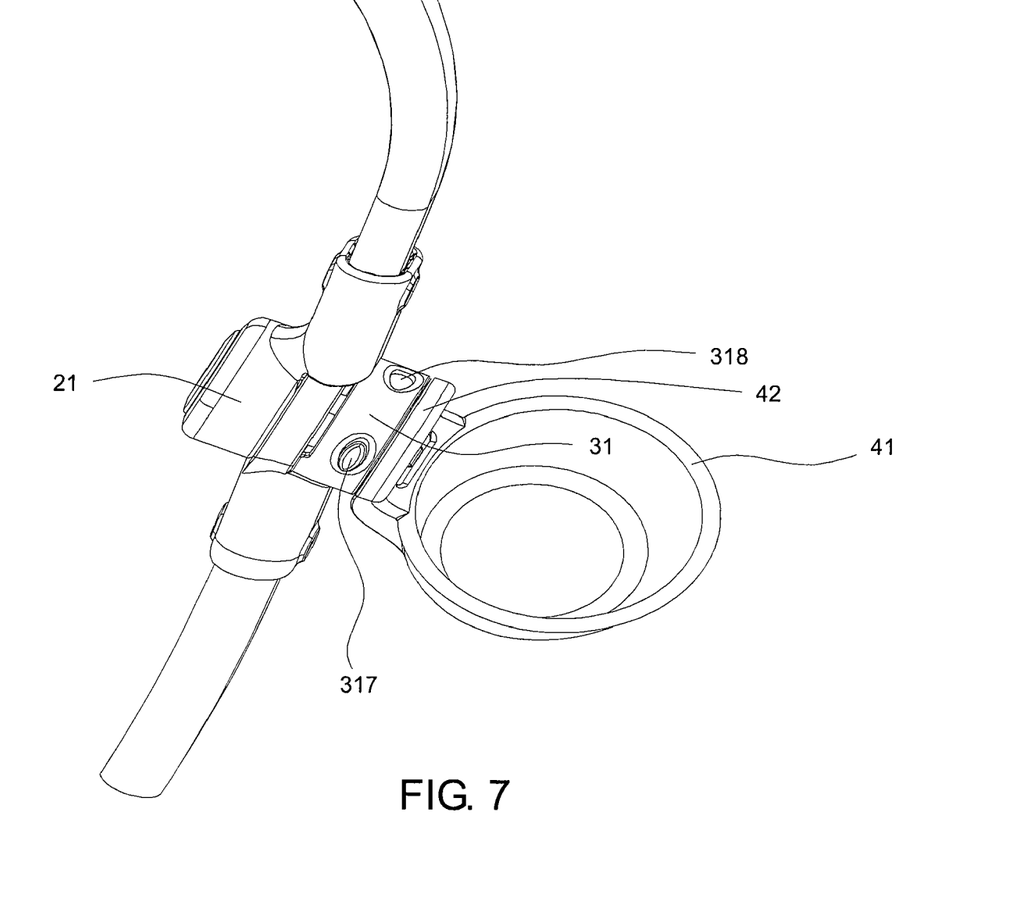
FIG. 7 is a schematic view illustrating the accessory support frame locked in a first position on the handle.
Figure 8:
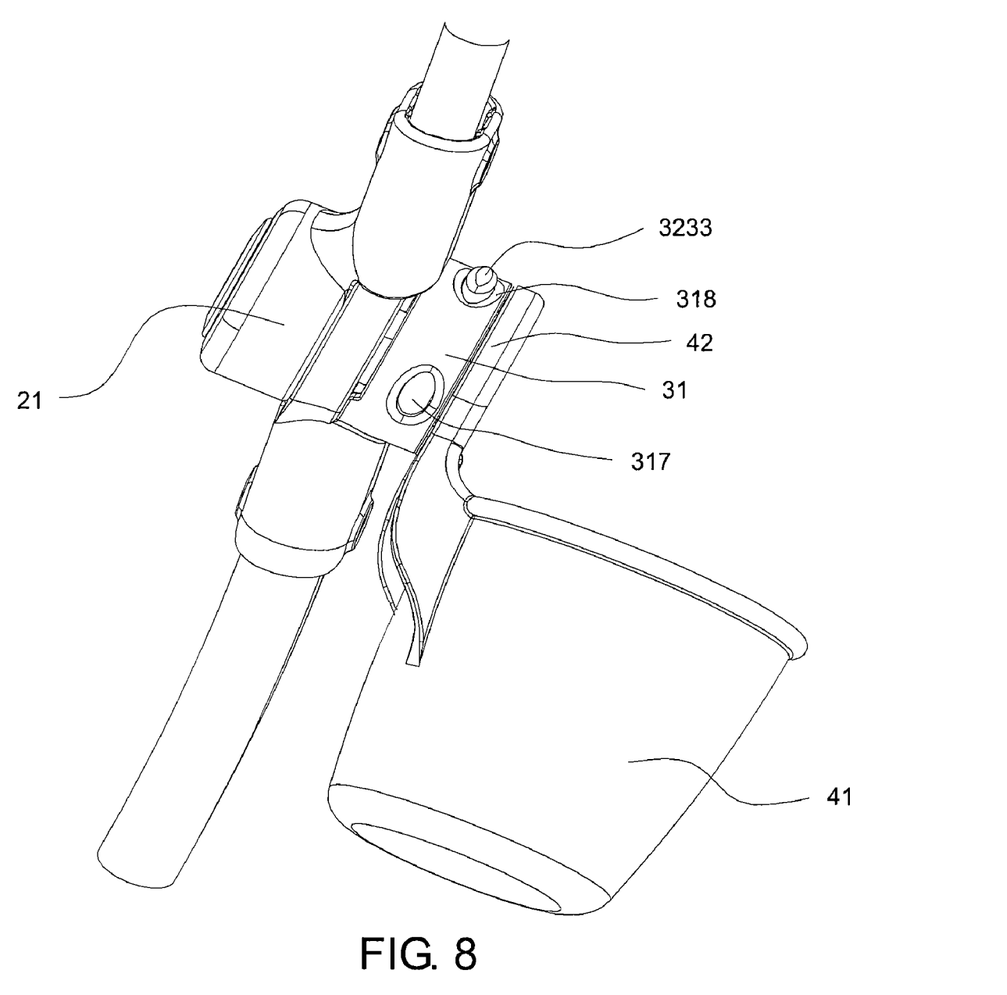
FIG. 8 is a schematic view illustrating the accessory support frame locked in a second position on the handle.

Referring to FIG. 6, the accessory support frame 4 may include a cup-like holder body 41 adapted to receive the placement of a bottle, cup and any objects therein. A hanger portion provided with a retainer flange 42 extends from the holder body 41. The hanger portion also includes a U-shaped slit 43 that defines a tongue portion 44 capable of resiliently deflecting relative to the hanger portion. The tongue portion 44 has an opening 45 that can detachably snap fit with the catch 3251 of the connecting portion 325.

FIGS. 9 and 10 respectively show the handle 1 in two different positions. According to the needs, the handle 1 can be oriented forward or rearward. To match the orientation of the handle 1, the position of the accessory support frame 4 can also be adjusted by rotation relative to the handle 1.

FIGS. 11-15 are schematic views illustrating a second embodiment provided with an accessory support device. Like the first embodiment, the second embodiment also includes a handle 1 extending symmetrically at two sides of the stroller, a connecting structure 2 provided on the handle 1, and a coupling structure 3 adapted to assemble with the connecting structure 2.

Figure 14:
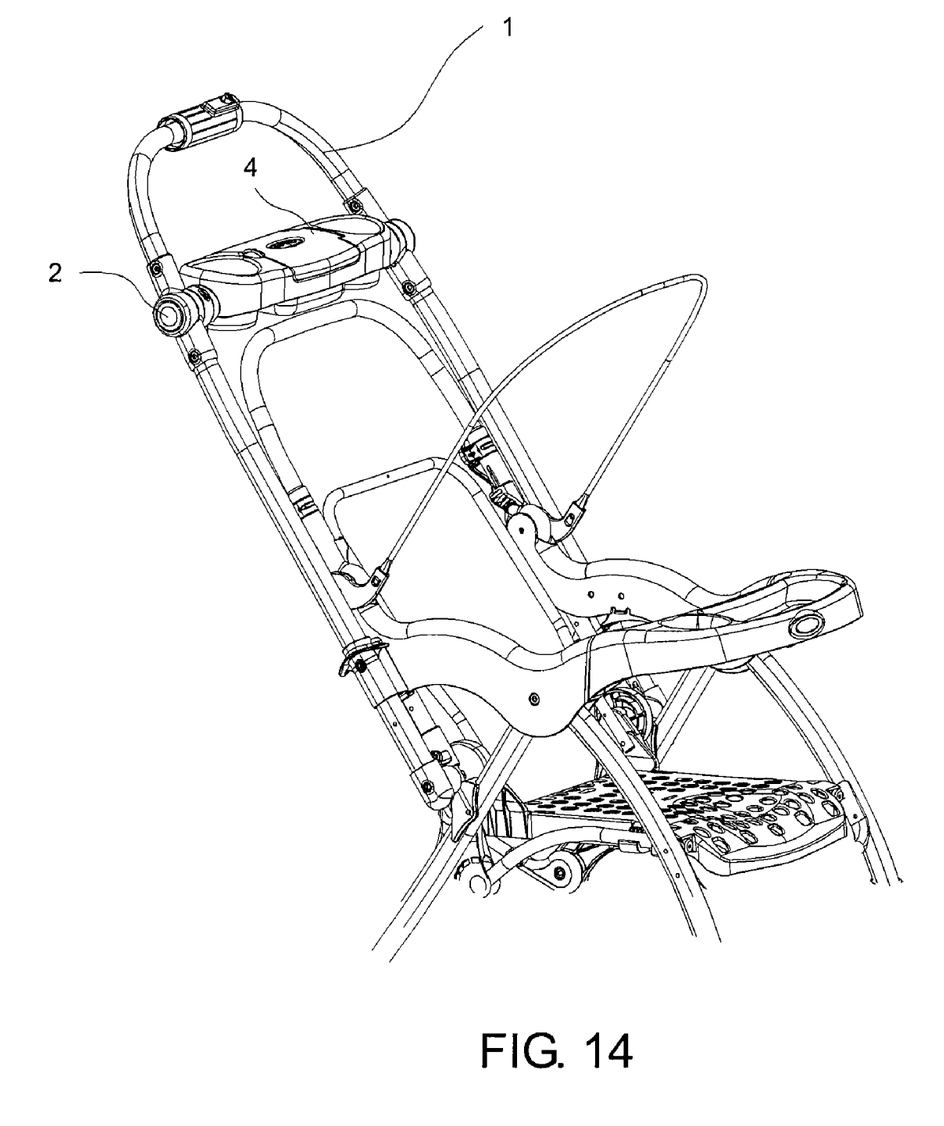
FIG. 14 is a schematic view illustrating a first position of the handle in the stroller apparatus with the accessory support device of FIG. 11 locked in a first position.
Figure 15:
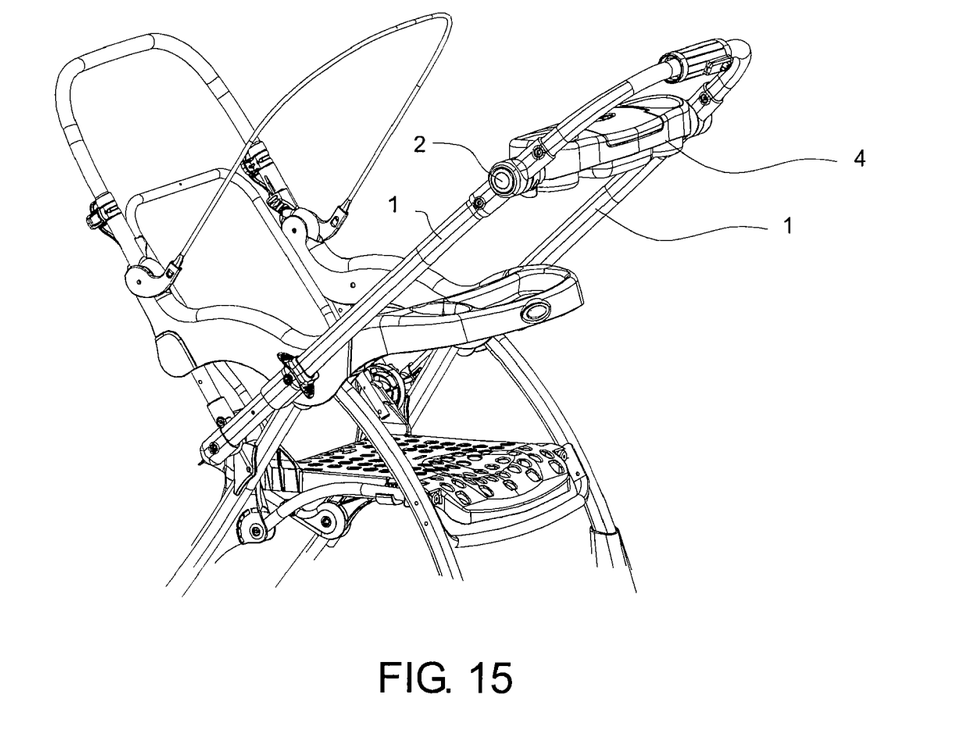
FIG. 15 is a schematic view illustrating a second position of the handle in the stroller apparatus with the accessory support device of FIG. 11 locked in a second position.

Referring to FIGS. 1, 14 and 15, in the second embodiment, the connecting structure 2 likewise includes a base 21 having a central region provided with a hole 211, and two threaded holes 212 located at two sides of the hole 211. The coupling structure 3 includes a coupling fixture 31, a rotary socket 32 pivotally mounted on the coupling fixture 31, and an accessory support frame 4 detachably mounted with the rotary socket 32. Holes 314 and 321 are provided at central regions of the coupling fixture 31 and rotary socket 32, respectively. Two screws 5 engage through the two threaded holes 212 of the base 21 and two corresponding threaded holes 315 of the coupling fixture 31 for affixing the coupling fixture 31 with the connecting structure 2. A rivet 6 is passed respectively through the holes 211, 314 and 321 of the base 21, coupling fixture 31 and rotary socket 32 for pivotally assembling the rotary socket 32 with the coupling fixture 31 and connecting structure 2.

Referring to FIG. 2, the coupling fixture 31 includes an outer sidewall 312 lying at periphery of the coupling fixture 31. The outer sidewall 312 has a generally cylindrical shape that delimits at least partially an inner space 313 of the coupling fixture 31. A bottom surface of the inner space 313 includes a central hole 314, and two threaded holes 315 at two opposite sides of the central hole 314. In addition, a curved rib 316 also protrudes from the bottom surface of the inner space 313 proximate to one of the two threaded holes 315 and at a location spaced apart from the outer sidewall 312. The curved rib 316 has a profile that is substantially parallel with the outer sidewall 312, such that a sliding track 3161 is defined at least partially between the curved rib 316 and the outer sidewall 312. Two opposite ends of the curved rib 316 also form a first and second stop portion 3162, 3163, respectively. The outer sidewall 312 includes a first latching opening 317 and second latching opening 318 through which an engagement stud 3233 of the rotary socket 32 can engage for locking rotation of the rotary socket 32. The first and second latching openings 317, 318 are disposed at different radial directions relative to the rotation axis defined by the rivet 6. The first and second stop portions 3162, 3163 act to restrict movement of a stud 3234 protruding inwardly from the rotary socket 32, such that the stud 3234 can only move along the sliding track 3161 between the first and second stop portions 3162 and 3163.

Referring to FIGS. 2 and 3, the rotary socket 32 includes an outer sidewall 322 having a generally cylindrical shape that delimits at least partially an inner space 323. A generally "8"-shaped hole 324 is formed centrally through a bottom surface of the inner space 323. A curved gap 3232 is also left through the outer sidewall 322 of the inner space 323. A detent 3231 provided with an engagement stud 3233 at one end thereof extends from the outer sidewall 322 at a side of the curved gap 3232. The engagement stud 3233 is thus integrally formed and resiliently connected with the rotary socket 32. The engagement stud 3233 is thus connected with the outer sidewall 322 of the rotary socket 32 via the detent 3231. The stud 3234 protrudes inward and is positioned in the sliding track 3161 of the coupling fixture 31. A connecting portion 325 projects from the rotary socket 32 at a side opposite the inner space 323. The connecting portion 325 includes a neck 326 adapted to engage with a retainer flange 42 on the accessory support frame 4 for attaching the accessory support frame 4 with the rotary socket 32. A distal end surface of the connecting portion 325 also includes a catch 3251 adapted to snap fit through an opening 45 provided on the accessory support frame 4.

Referring to FIGS. 4, 5, 7 and 8, when the rotary socket 32 rotates an angle around the rotation axis of the rivet 6 relative to the coupling fixture 31, the stud 3234 accordingly slides until it reaches and is arrested by either of the first and second stop portions 3162, 3163. When the stud 3234 abuts against any of the first and second stop portions 3162, 3163, the engagement stud 3233 on the detent 3231 can engage with one of the latching openings (i.e., either of the first and second latching openings 317 and 318) for locking the position of the rotary socket 32 and accessory support frame 4 relative to the coupling fixture 31. After the orientation of the handle 1 is changed, the position of the accessory support frame 4 can be changed by first pushing on the engagement stud 3233. As a result, the detent 3231 deforms and causes the engagement stud 3233 to disengage from the first or second latching opening 317, 318, whereby allowing rotation of the rotary socket 32 and accessory support frame 4 relative to the coupling fixture 31. The accessory support frame 4 and rotary socket 32 can then be rotated in unison around the axis of the rivet 6, until the engagement stud 3233 engages with another latching opening under resilient action of the detent 3231 for locking the accessory support frame 4.

Figure 11:
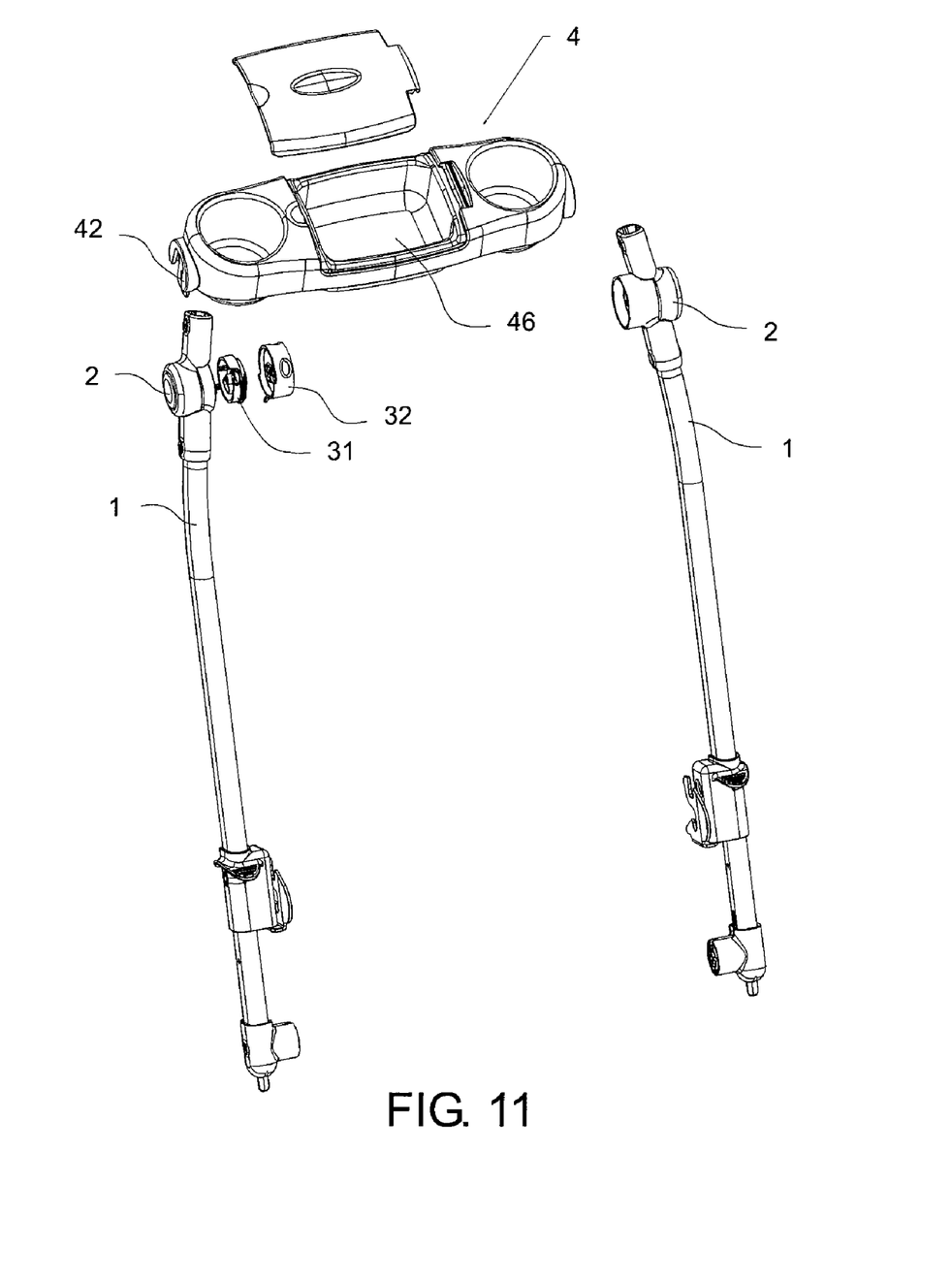
FIG. 11 is an exploded view illustrating a second embodiment of an accessory support device.
Figure 12:
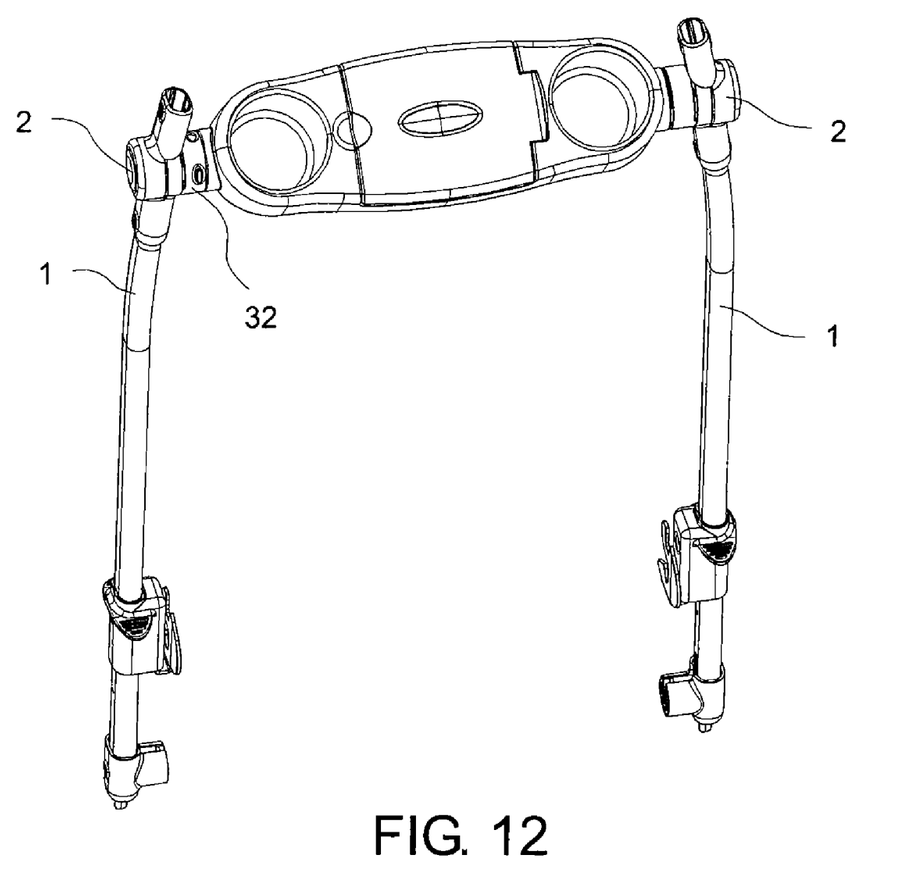
FIGS. 12 and 13 are schematic views illustrating various adjustable positions of the accessory support device shown in FIG. 11.
Figure 13:
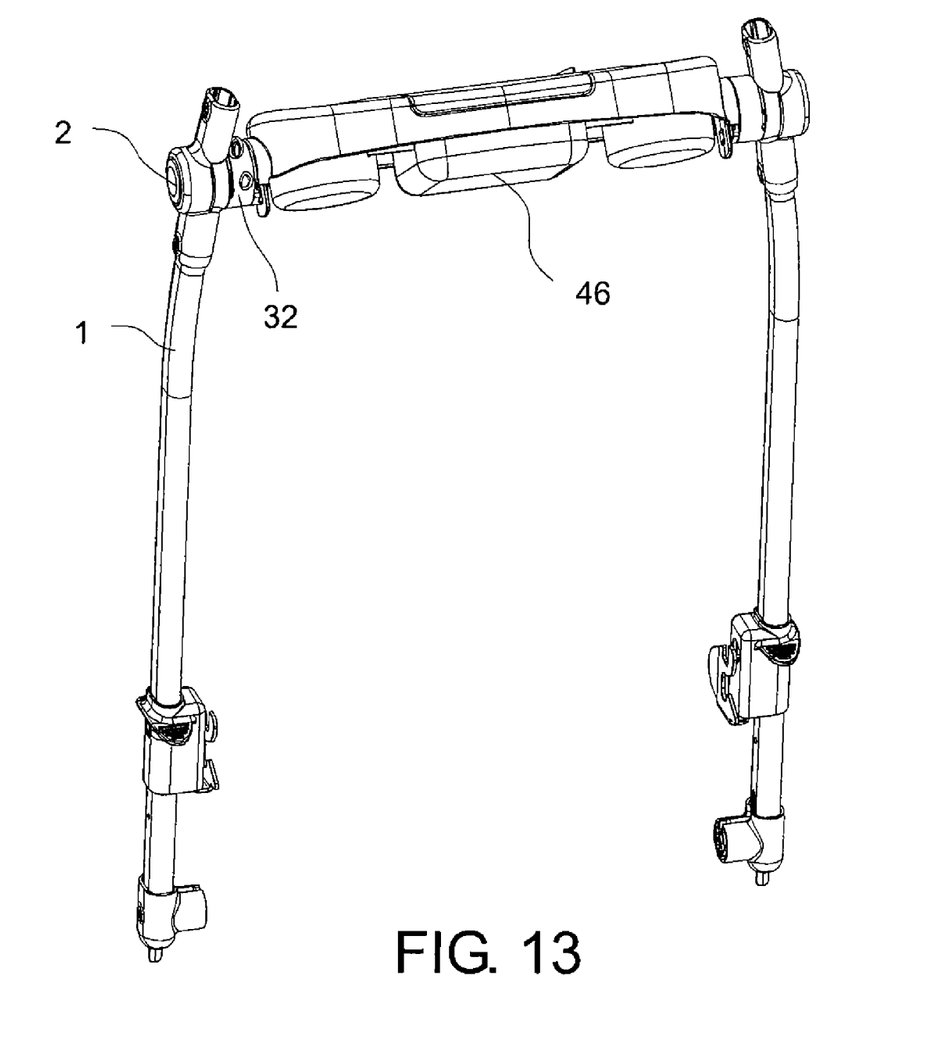

Referring to FIGS. 11, 12 and 13, the accessory support frame 4 can include a tray 46 having two opposite sides respectively provided with retainer flanges 42 for assembling the tray 46 between two parallel segments of the handle 1. Each of the retainer flanges 42 may have a structure similar to the retainer flange 42 shown in FIG. 6. In addition, each of the two opposite sides of the tray 46 may also have a U-shaped slit (such as slit 43 shown in FIG. 6) that defines a tongue portion (such as tongue 44 shown in FIG. 6) capable of resiliently deflection. The tongue portion also has an opening (such as opening 45 shown in FIG. 6) that can detachably snap fit with the catch 3251 of the connecting portion 325 for fastening the tray 46 with the rotary socket 32.

FIGS. 14 and 15 respectively show the handle 1 in two different positions. According to the needs, the handle 1 can be oriented forward or rearward. To match the configuration of the handle 1, the position of the accessory support frame 4 can also be adjusted by rotation relative to the handle 1.

At least one advantage of the accessory support device described herein is the ability to pivotally adjust the position of the accessory support frame in a convenient manner, according to the orientation of the handle. In addition, the accessory support device uses a construction that can reliably lock the position of the accessory support frame at any orientation.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An accessory support device for a stroller apparatus, wherein the stroller apparatus includes a handle, the accessory support device comprising:
   a coupling fixture affixed with the handle, wherein the coupling fixture includes an outer sidewall through which are formed a plurality of latching openings;
   a rotary socket pivotally assembled with the coupling fixture, wherein the rotary socket includes a detent and a connecting portion; and
   an accessory support frame detachably fastened with the connecting portion of the rotary socket, the accessory support frame being adapted to receive the placement of an object;
   wherein the accessory support frame is operable to rotate with the rotary socket relative to the coupling fixture, and the detent is movable to engage with any one of the latching openings to lock the accessory support frame at different angular positions relative to the coupling fixture.

2. The device according to claim 1, wherein the coupling fixture includes a curved rib that defines a sliding track for guiding movement of the rotary socket, the curved rib having two opposite sides respectively forming a first and second stop portion, and the rotary socket comprises a protruding stud that abuts against one of the first and second stop portion after the rotary socket rotates an angle relative to the coupling fixture.

3. The device according to claim 2, wherein the detent engages with one of the latching openings when the protruding stud abuts against one of the first and second stop portion.

4. The device according to claim 1, wherein the detent is formed with the rotary socket in a single body.

5. The device according to claim 4, wherein the detent is connected with the outer sidewall of the rotary socket.

6. The device according to claim 1, wherein the connecting portion of the rotary socket protrudes outward and includes a neck portion adapted to engage with a retainer flange provided on the accessory support frame.

7. The device according to claim 6, wherein the accessory support frame includes an opening formed through a resilient tongue portion through which a catch provided on the connecting portion snap fits when the accessory support frame and the rotary socket are affixed with each other.

8. The device according to claim 7, wherein the accessory support frame includes a cup body.

9. The device according to claim 7, wherein the accessory support frame includes a tray mounted between two parallel segments of the handle.

10. A stroller apparatus comprising:
    a stroller frame;

a handle;

a coupling fixture affixed with the handle, wherein the coupling fixture includes a plurality of latching openings;

a rotary socket pivotally assembled with the coupling fixture, wherein the rotary socket includes a detent and a connecting portion; and an accessory support frame detachably fastened with the connecting portion of the rotary socket, the accessory support frame being adapted to receive the placement of an object;

wherein the accessory support frame is operable to rotate with the rotary socket relative to the coupling fixture, and the detent is movable to engage with any one of the latching openings to lock the accessory support frame at different angular positions relative to the coupling fixture.

11. The stroller apparatus according to claim 10, wherein the coupling fixture includes an outer sidewall and a curved rib that define at least partially a sliding track for guiding movement of the rotary socket, the curved rib having two opposite sides respectively forming a first and second stop portion, and the latching openings including at least a first and second latching openings formed through the outer sidewall.

12. The stroller apparatus according to claim 11, wherein the rotary socket comprises a protruding stud that abuts against one of the first and second stop portion after the rotary socket rotates an angle relative to the coupling fixture.

13. The stroller apparatus according to claim 12, wherein the detent engages with one of the latching openings when the protruding stud abuts against one of the first and second stop portion.

14. The stroller apparatus according to claim 10, wherein the detent is formed with the rotary socket in a single body.

15. The stroller apparatus according to claim 14, wherein the detent is connected with the outer sidewall of the rotary socket.

16. The stroller apparatus according to claim 10, wherein the connecting portion of the rotary socket protrudes outward and includes a neck portion adapted to engage with a retainer flange provided on the accessory support frame.

17. The stroller apparatus according to claim 16, wherein the accessory support frame includes an opening formed through a resilient tongue portion through which a catch provided on the connecting portion snap fits when the accessory support frame and the rotary socket are affixed with each other.

18. The stroller apparatus according to claim 17, wherein the accessory support frame includes a bottle holder.

19. The stroller apparatus according to claim 17, wherein the accessory support frame includes a tray mounted between two parallel segments of the handle.

20. An accessory support device for a stroller apparatus, wherein the stroller apparatus includes a handle, the accessory support device comprising:

a coupling fixture affixed with the handle, wherein the coupling fixture includes a plurality of latching openings;

a rotary socket pivotally assembled with the coupling fixture, wherein the rotary socket includes a resilient detent and a connecting portion; and an accessory support frame detachably fastened with the connecting portion of the rotary socket, the accessory support frame being adapted to receive the placement of an object;

wherein the accessory support frame is operable to rotate with the rotary socket and the detent relative to the coupling fixture, and the detent is movable to engage with any one of the latching openings to lock the accessory support frame at different angular positions relative to the coupling fixture.

* * * * *